US008784995B2

(12) United States Patent
Omura et al.

(10) Patent No.: US 8,784,995 B2
(45) Date of Patent: Jul. 22, 2014

(54) GRAIN ORIENTED ELECTRICAL STEEL SHEET AND METHOD FOR MANUFACTURING THE SAME

(75) Inventors: Takeshi Omura, Tokyo (JP); Hirotaka Inoue, Tokyo (JP); Hiroi Yamaguchi, Tokyo (JP); Seiji Okabe, Tokyo (JP); Yasuyuki Hayakawa, Tokyo (JP)

(73) Assignee: JFE Steel Corporation (JP)

( * ) Notice: Subject to any disclaimer, the term of this patent is extended or adjusted under 35 U.S.C. 154(b) by 0 days.

(21) Appl. No.: 13/821,608

(22) PCT Filed: Sep. 9, 2011

(86) PCT No.: PCT/JP2011/005103
§ 371 (c)(1), (2), (4) Date: Mar. 8, 2013

(87) PCT Pub. No.: WO2012/032792
PCT Pub. Date: Mar. 15, 2012

(65) Prior Publication Data

US 2013/0160901 A1 Jun. 27, 2013

(30) Foreign Application Priority Data

Sep. 10, 2010 (JP) ................................ 2010-203425

(51) Int. Cl.

| | |
|---|---|
| ***C21D 1/70*** | (2006.01) |
| ***H01F 1/00*** | (2006.01) |
| ***B32B 9/00*** | (2006.01) |
| ***B32B 15/04*** | (2006.01) |

(52) U.S. Cl.
USPC ............................ 428/471; 148/306; 148/537

(58) Field of Classification Search
USPC .......... 148/537, 306, 308, 111–112; 428/209, 428/446, 457, 471
See application file for complete search history.

(56) References Cited

U.S. PATENT DOCUMENTS

| | | | | |
|---|---|---|---|---|
| 4,770,720 | A | 9/1988 | Kobayashi et al. | |
| 2002/0157734 | A1* | 10/2002 | Senda et al. | 148/111 |
| 2009/0165895 | A1 | 7/2009 | Ushigami et al. | |

FOREIGN PATENT DOCUMENTS

| | | | |
|---|---|---|---|
| CN | 101454465 | A | 6/2009 |
| EP | 0 589 418 | | 3/1994 |

(Continued)

OTHER PUBLICATIONS

The Canadian Office Action issued on Dec. 13, 2013 in corresponding Canadian Patent Application No. 2,808,774.

(Continued)

*Primary Examiner* — Roy King
*Assistant Examiner* — Jenny Wu
(74) *Attorney, Agent, or Firm* — DLA Piper LLP (US)

(57) ABSTRACT

A grain oriented electrical steel sheet has linear grooves for magnetic domain refinement formed on a surface thereof and may reduce iron loss by using these linear grooves, where the proportion of those linear grooves having crystal grains directly beneath themselves, each crystal grain having an orientation deviating from the Goss orientation by 10° or more and a grain size of 5 μm or more, is controlled to 20% or less, and secondary recrystallized grains are controlled to have an average β angle of 2.0° or less, and each secondary recrystallized grain having a grain size of 10 mm or more is controlled to have an average β-angle variation of 1° to 4°.

2 Claims, 1 Drawing Sheet

(56) References Cited

FOREIGN PATENT DOCUMENTS

| | | | | |
|---|---|---|---|---|
| EP | 1 227 163 | | | 7/2002 |
| JP | 57-002252 | B2 | | 1/1982 |
| JP | 62-053579 | B2 | | 11/1987 |
| JP | 7-268474 | A | | 10/1995 |
| JP | 10-280040 | A | | 10/1998 |
| JP | 2002-241906 | A | | 8/2002 |
| JP | 2002241906 | A | * | 8/2002 |
| JP | 2009-235471 | A | | 10/2009 |

OTHER PUBLICATIONS

The Chinese Office Action issued on Oct. 18, 2013 in corresponding Chinese Patent Application No. 201180043642.4.

Chinese Official Action dated Mar. 27, 2014 along with an English translation from corresponding Chinese Patent Application No. 201180043642.4.

European Search Report dated Mar. 6, 2014 from corresponding European Patent Application No. EP 11 82 3271.

* cited by examiner

GRAIN ORIENTED ELECTRICAL STEEL SHEET AND METHOD FOR MANUFACTURING THE SAME

RELATED APPLICATIONS

This application is a §371 of International Application No. PCT/JP2011/005103, with an international filing date of Sep. 9, 2011 (WO 2012/032792 A1, published Mar. 15, 2012), which is based on Japanese Patent Application No. 2010-203425, filed Sep. 10, 2010, the subject matter of which is incorporated herein by reference.

TECHNICAL FIELD

This disclosure relates to a grain oriented electrical steel sheet used for iron core materials such as transformers, and a method for manufacturing the same.

BACKGROUND

Grain oriented electrical steel sheets, which are mainly used as iron cores of transformers, are required to have excellent magnetic properties, in particular, less iron loss.

To meet this requirement, it is important that secondary recrystallized grains are highly aligned in the steel sheet in the (110)[001] orientation (or so-called "Goss orientation") and impurities in the product steel sheet are reduced. However, there are limitations to control crystal orientation and reduce impurities in terms of balancing with manufacturing cost, and so on. Therefore, techniques have been developed to introduce non-uniform strain to the surfaces of a steel sheet in a physical manner and reducing the magnetic domain width for less iron loss, namely, magnetic domain refining techniques.

For example, JP 57-002252 B proposes a technique for reducing iron loss of a steel sheet by irradiating a final product steel sheet with a laser, introducing a high dislocation density region to the surface layer of the steel sheet and reducing the magnetic domain width.

In addition, JP 62-053579 B proposes a technique for refining magnetic domains by forming grooves having a depth of more than 5 μm on the base iron portion of a steel sheet after final annealing at a load of 882 to 2156 MPa (90 to 220 kgf/mm$^2$), and then subjecting the steel sheet to heat treatment at a temperature of 750° C. or higher.

With the development of the above-described magnetic domain refining techniques, grain oriented electrical steel sheets having good iron loss properties may be obtained.

However, among the above-mentioned techniques for performing magnetic domain refining treatment by forming grooves, particularly, techniques for forming linear grooves by electrolytic etching for magnetic domain refining treatment do not always offer a sufficient effect on reducing iron loss as compared to other magnetic domain refining techniques for introducing high dislocation density regions by laser irradiation, and so on.

It could therefore be helpful to provide a grain oriented electrical steel sheet with an improved iron loss reduction effect when linear grooves for magnetic domain refinement are formed by electrolytic etching, and an advantageous method for manufacturing the same.

SUMMARY

We discovered that if magnetic domain refining treatment is performed by linear grooves formed by electrolytic etching, and when an average β angle of secondary recrystallized grains is 2.0° or less, then the magnetic domain width before the treatment becomes too large to ensure effective magnetic domain refinement. Hence, it is not possible to expect a sufficient improvement in iron loss property.

We then discovered that even if an average β angle of secondary recrystallized grains is 2.0° or less, magnetic domains of the steel sheet are refined sufficiently to obtain a grain oriented electrical steel sheet that affords a significant, stable improvement in iron loss property, by:

(a) specifying the orientation and grain size of fine grains directly beneath linear grooves for magnetic domain refinement within a predetermined range, and controlling the proportion of those linear grooves having the specified fine grains (also be referred to as "groove frequency") to be a predetermined value, and (b) controlling the β-angle variation range in secondary recrystallized grain (maximum β angle minus minimum β angle in one crystal grain) within a predetermined range.

We thus provide:

[1] A grain oriented electrical steel sheet comprising: a forsterite film and tension coating on a surface of the steel sheet; and linear grooves for magnetic domain refinement on the surface of the steel sheet, wherein the proportion of linear grooves, each having crystal grains directly beneath itself, each crystal grain having an orientation deviating from the Goss orientation by 10° or more and a grain size of 5 μm or more, is 20% or less, and wherein secondary recrystallized grains are controlled to have an average β angle of 2.0° or less, and each secondary recrystallized grain having a grain size of 10 mm or more has an average β-angle variation range of 1° to 4°.

[2] A method for manufacturing a grain oriented electrical steel sheet, the method comprising:

subjecting a slab for a grain oriented electrical steel sheet to hot rolling to obtain a hot-rolled steel sheet;

then, optionally, subjecting the steel sheet to hot band annealing;

subjecting the steel sheet to subsequent cold rolling once, or twice or more with intermediate annealing performed therebetween, to be finished to a final sheet thickness;

subjecting the steel sheet to subsequent decarburization;

then applying an annealing separator mainly composed of MgO to a surface of the steel sheet before subjecting the steel sheet to final annealing; and subjecting the steel sheet to subsequent tension coating, wherein (1) linear grooves are formed in a widthwise direction of the steel sheet by electrolytic etching before the final annealing for forming a forsterite film, (2) an average cooling rate within a temperature range of at least 750° C. to 350° C. is 40° C./s or higher during cooling at the time of the hot band annealing, (3) an average heating rate within a temperature range of at least 500° C. to 700° C. is controlled to be 50° C./s or higher during heating at the time of the decarburization, and (4) the final annealing is performed on the steel sheet in the form of a coil having a diameter within a range of 500 mm to 1500 mm.

It is possible to provide such a grain oriented electrical steel sheet that affords a significant iron loss reducing effect as compared to conventional ones when performing magnetic domain refining treatment where linear grooves are formed by electrolytic etching.

BRIEF DESCRIPTION OF THE DRAWINGS

Our steel sheets and methods will be further described below with reference to the accompanying drawings.

DETAILED DESCRIPTION

Figure 1:
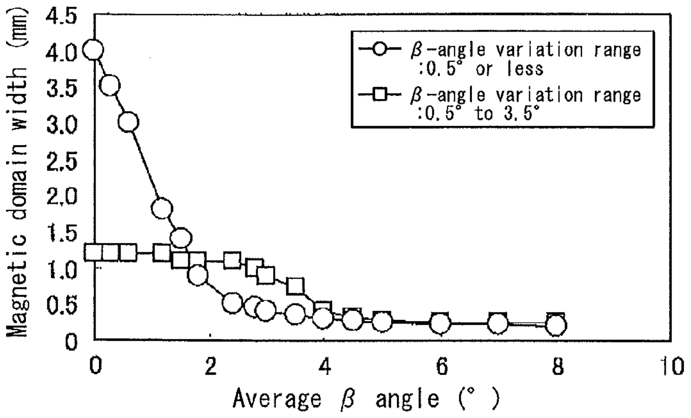
FIG. 1 is a graph illustrating a relationship between the average β angle in crystal grain and the magnetic domain width, in terms of β-angle variation ranges in crystal grain as parameters.

Linear grooves (hereinafter, also referred to simply as "grooves") are formed by using electrolytic etching. This is because, although there are other methods to form grooves using mechanical schemes (such as using rolls with projections or scrubbing), these approaches are considered disadvantageous because such approaches lead to increased unevenness of surfaces of a steel sheet. Hence, for example, there is a reduced stacking factor of the steel sheet when producing a transformer.

In addition, when a mechanical scheme is used for groove formation, it is necessary to perform annealing at a later stage to relieve strain from the steel sheet, whereby many fine grains with poor orientation will be formed directly beneath the grooves, which makes it difficult to control the proportion of those grooves with predetermined fine grains present directly beneath themselves.

Groove Frequency≤20%

We focus on those of fine grains directly beneath grooves that have an orientation deviating from the Goss orientation by 10° or more and a grain size of 5 μm or more, and the proportion of those linear grooves with such crystal grains present directly beneath themselves is important herein (this proportion will be also referred to as "groove frequency"). This groove frequency is 20% or less.

This is because it is important in improving iron loss property of the steel sheet to leave as few crystal grains largely deviating from the Goss orientation as possible directly beneath the portions where grooves are formed.

It should be noted here that JP '579 and JP 7-268474 A state that iron loss property of a steel sheet improves more where fine grains are present directly beneath the grooves. However, we found that it is necessary to minimize the existence of fine grains having a poor orientation because the existence of such fine grains contributes to deterioration rather than improvement in iron loss property.

In addition, we found as mentioned earlier that those steel sheets having groove frequency of 20% or less exhibited good iron loss property. Thus, as mentioned above, the groove frequency is 20% or less.

Fine grains outside the above-described range, ultrafine grains sized 5 μm or less, as well as fine grains sized 5 μm or more, but having a good crystal orientation deviating from the Goss orientation by less than 10°, have neither adverse nor positive effects on iron loss property. Hence, there is no problem if these grains are present. In addition, the upper limit of grain size is about 300 μm. This is because if the grain size exceeds this limit, material iron loss deteriorates and, therefore, lowering the frequency of grooves having fine grains to some extent does not have much effect on improving iron loss of an actual transformer.

The crystal grain diameter of fine grains, crystal orientation difference and groove frequency are determined as follows.

As to the crystal grain diameter of fine grains, a cross-section is observed at 100 points in a direction perpendicular to groove portions and, if there is a crystal grain, the crystal grain size thereof is calculated as an equivalent circle diameter. In addition, crystal orientation difference is determined as a deviation angle from the Goss orientation by using EBSP (Electron BackScattering Pattern) to measure the crystal orientation of crystals at the bottom portions of grooves.

Further, as used herein, the term groove frequency indicates a proportion obtained by dividing the number of grooves beneath which crystal grains as are present in the above-described 100 measurement points by 100.

Then, we conducted further investigation on the magnetic domain width and iron loss of grain oriented electrical steel sheets having different average β angles of secondary recrystallized grains (hereinafter, referred to simply as "average β angles") and different intra-grain β-angle variation ranges in the secondary recrystallized grains (hereinafter, referred to simply as "β-angle variation ranges") (in this case, samples having average β angles of 0.5° or less and samples having average β angles of 2.5° to 3.5° were evaluated, and all the evaluated samples proved to have average α angles in the range of 2.8° to 3.2° and substantially equal α angles).

FIG. 1 illustrates the relationship between the average β angle and the magnetic domain width before magnetic domain refining treatment.

As shown in FIG. 1, for the smaller β-angle variation range, a significant increase in magnetic domain width was observed where average β angle is 2° or less. On the other hand, for the larger β-angle variation range, there was little increase in magnetic domain width where average β angle is 2° or less. We believe that this is because in the larger β-angle variation range, some portion in the secondary recrystallized grain that has larger β angles, i.e., smaller magnetic domain widths have a magnetic influence on the other portion therein having smaller β angles, i.e., larger magnetic domain widths, resulting in little increase in magnetic domain width.

Figure 2:
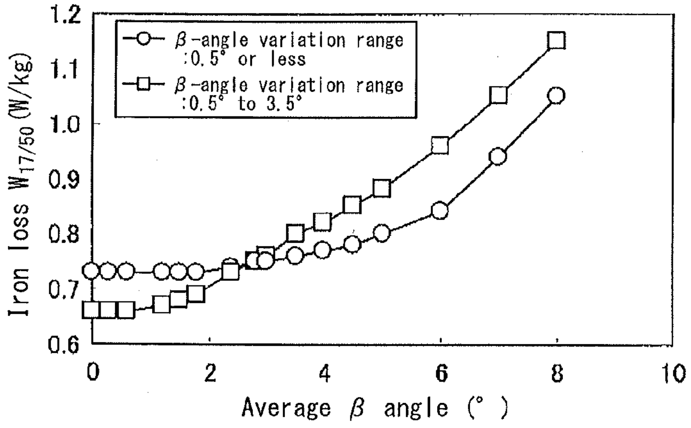
FIG. 2 is a graph illustrating the relationship between the average β angle and the iron loss value $W_{17/50}$ of a steel sheet subjected to magnetic domain refining treatment by means of linear groove formation, in terms of β-angle variation ranges in crystal grain as parameters.
Figure 3:
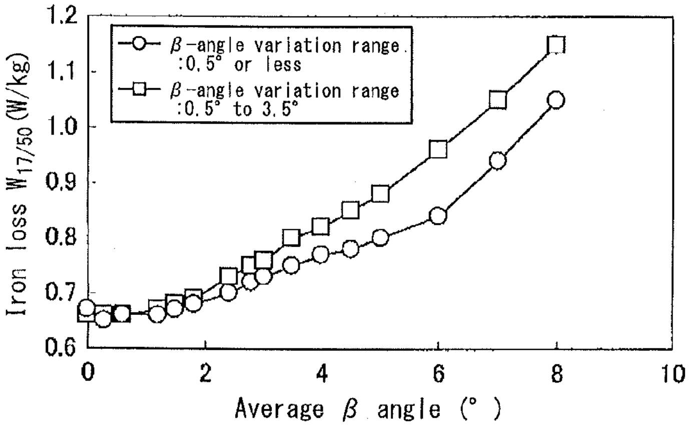
FIG. 3 is a graph illustrating the relationship between the average β angle and the iron loss value $W_{17/50}$ of a steel sheet subjected to magnetic domain refining treatment by means of strain introduction, in terms of the β-angle variation ranges in crystal grain as parameters.

Then, FIGS. 2 and 3 illustrate the results of investigating the relationship between the iron loss and the average β angle after magnetic domain refining treatment by groove formation and strain introduction.

As shown in FIG. 3, if strain was introduced into steel sheets, no significant iron loss difference was observed among those steel sheets having smaller average β angles depending on the β-angle variation range, whereas those steel sheets having larger average β angles and larger β-angle variation ranges showed a tendency to experience larger iron loss.

On the other hand, if grooves were formed in a steel sheet, it was found that the steel sheet has a tendency to exhibit good iron loss property if it has a small average β angle, but a large β-angle variation range as shown in FIG. 2.

This is because, as the iron loss reducing effect attained by magnetic domain refining treatment using groove formation is small from the beginning, it is not possible to achieve sufficient refinement of magnetic domains when the magnetic domain width is large, which leads to an insufficient iron loss reducing effect. In contrast, we believe that the magnetic domain width can be refined prior to magnetic domain refining treatment by introducing variations in β angle in secondary recrystallized grains at the same time, which results in a steel sheet with less iron loss.

Thereafter, as a result of further analysis on the conditions under which a better iron loss reducing effect is obtained, we found that it is important to control the average β-angle variation range at 1° to 4° when the average β angle is 2.0° or less.

The crystal orientation of secondary recrystallized grains is measured at 1 mm pitches using the X-ray Laue method, where the intra-grain variation range (equivalent to β-angle variation range) and the average crystal orientation (α angle, β angle) of that crystal grain are determined from every measurement point in one crystal grain. In addition, 50 crystal grains are measured in an arbitrary position of a steel sheet to calculate an average thereof, which is then considered as the crystal orientation of that steel sheet.

As used herein, "α angle" means a deviation angle from the (110)[001] ideal orientation around the axis in normal direction (ND) of the orientation of secondary recrystallized grains; and "β angle" means a deviation angle from the (110) [001] ideal orientation around the axis in transverse direction (TD) of the orientation of secondary recrystallized grains.

However, secondary recrystallized grains having a grain size of 10 mm or more are selected as secondary recrystallized grains for which β angle variation range is to be measured. Specifically, in crystal orientation measurement using the above-described X-ray Laue method, one crystal grain is regarded as being within a range where α angle is constant, and the length (grain size) of each crystal grain is determined to obtain β-angle variation ranges of those crystal grains having a length of 10 mm or more, thereby calculating an average thereof.

Magnetic domain width is determined by observing the magnetic domain of a surface subjected to magnetic domain refining treatment using the Bitter method. As with crystal orientation, magnetic domain width is determined as follows: magnetic domain widths of 50 crystal grains are measured to calculate an average thereof and the obtained average is the magnetic domain width of the entire steel sheet.

Conditions of manufacturing a grain oriented electrical steel sheet will now be specifically described below.

First, as an important point, a method for varying β angles will be described.

β angle variation may be controlled by adjusting curvature per secondary recrystallized grain and grain size of each secondary recrystallized grain during final annealing. Factors affecting the curvature per secondary recrystallized grain include coil diameter during final annealing.

That is, the curvature decreases and the β-angle variation becomes less significant with increasing coil diameter. On the other hand, regarding the grain size of secondary recrystallized grains, β angle variation becomes less significant with smaller grain size. In addition, as used herein, "coil diameter" means the diameter of a coil.

However, although the coil diameter of a steel sheet can be changed to a certain extent during manufacture of a grain oriented electrical steel sheet, problems arise due to coil deformation if the coil diameter becomes too large, whereas it becomes more difficult to conduct shape correction during flattening annealing if the coil diameter becomes too small, and so on. As such, there are many limitations on controlling the β-angle variation range by changing the coil diameter alone, which renders such control difficult. Therefore, we combine changing the coil diameter with controlling of the grain size of secondary recrystallized grains. In addition, the grain size of secondary recrystallized grain may be controlled by adjusting the heating rate within a temperature range of at least 500° C. to 700° C. during decarburization.

Accordingly, the average β-angle variation range in secondary recrystallized grain is controlled to 1° to 4° by adjusting the above-described two parameters, i.e., coil diameter and grain size of secondary recrystallized grain, so that:

(1) during final annealing, the coil diameter is 500 mm to 1500 mm; and (2) during heating step in decarburization, the average heating rate at least at a temperature of 500° C. to 700° C. is 50° C./s or higher.

The upper limit of the above-described average heating rate is preferably about 700° C./s from the viewpoint of facilities, although not limited to a particular range.

The coil diameter is controlled to be not more than 1500 mm because, as mentioned earlier, if it is more than 1500 mm, problems arise in relation to coil deformation and, furthermore, the steel sheet would have excessively large curvature which may result in an average β-angle variation range of those secondary grains having a grain size of 10 mm or more being less than 1°. On the other hand, coil diameter is controlled to be not less than 500 mm, because it is difficult to perform shape correction during flattening annealing if it is less than 500 mm, as mentioned earlier.

While the electrical steel sheet needs to have an average β angle of 2.0° or less, for the purpose of controlling average β angles, it is extremely effective to improve the primary recrystallization texture by controlling the cooling rate during hot band annealing and controlling the heating rate during decarburization.

That is, a higher cooling rate during hot band annealing allows fine carbides to precipitate during cooling, thereby causing a change in the primary recrystallization texture to be formed after rolling.

In addition, as the heating rate during decarburization may change the primary recrystallization texture, it is possible to control not only the grain size, but also the selectivity of secondary recrystallized grains. That is, average β angles may be controlled by increasing the heating rate.

Specifically, average β angles may be controlled by satisfying the following two conditions:

(1) the cooling rate during hot band annealing is 40° C./s or higher on average at a temperature of at least 750° C. to 350° C.; and (2) the heating rate during decarburization is 50° C./s or higher on average at a temperature of at least 500° C. to 700° C.

The upper limit of the above-described cooling rate is preferably about 100° C./s from the viewpoint of facilities, although not limited to a particular range. In addition, the upper limit of the above-described heating rate is preferably about 700° C./s, as mentioned above.

A slab for a grain oriented electrical steel sheet may have any chemical composition that allows for secondary recrystallization having a great magnetic domain refining effect.

In addition, if an inhibitor, e.g., an AlN-based inhibitor is used, Al and N may be contained in an appropriate amount, respectively, while if a MnS/MnSe-based inhibitor is used, Mn and Se and/or S may be contained in an appropriate amount, respectively. Of course, these inhibitors may also be used in combination. In this case, preferred contents of Al, N, S and Se are: Al: 0.01 to 0.065 mass %; N: 0.005 to 0.012 mass %; S: 0.005 to 0.03 mass %; and Se: 0.005 to 0.03 mass %, respectively.

Further, our grain oriented electrical steel sheets may have limited contents of Al, N, S and Se without using an inhibitor.

In this case, the contents of Al, N, S and Se are preferably Al: 100 mass ppm or less, N: 50 mass ppm or less, S: 50 mass ppm or less, and Se: 50 mass ppm or less, respectively.

The basic elements and other optionally added elements of the slab for a grain oriented electrical steel sheet will be specifically described below.

C≤0.08 mass %

C is added to improve the texture of a hot-rolled sheet. However, C content exceeding 0.08 mass % makes it harder to reduce C content to 50 mass ppm or less where magnetic aging will not occur during the manufacturing process. Thus, C content is preferably 0.08 mass % or less. Besides, it is not necessary to set a particular lower limit to C content because secondary recrystallization is also enabled by a material without containing C. 2.0 mass % ≤Si≤8.0 mass %

Si is an element useful to increase electrical resistance of steel and improve iron loss property. However, Si content below 2.0 mass % cannot achieve a sufficient iron loss reducing effect, whereas Si content above 8.0 mass % leads to a significant deterioration in workability as well as a reduction in magnetic flux density. Thus, Si content is preferably 2.0 to 8.0 mass %. 0.005 mass % ≤Mn≤1.0 mass %

Mn is an element necessary to improve hot workability. However, Mn content below 0.005 mass % has a less addition effect, while Mn content above 1.0 mass % reduces the magnetic flux density of product sheets. Thus, Mn content is preferably 0.005 to 1.0 mass %.

Further, in addition to the above elements, the slab may also contain the following elements known to improve magnetic properties:

at least one element selected from: Ni: 0.03 to 1.50 mass %; Sn: 0.01 to 1.50 mass %; Sb: 0.005 to 1.50 mass %; Cu: 0.03 to 3.0 mass %; P: 0.03 to 0.50 mass %; Mo: 0.005 to 0.10 mass %; and Cr: 0.03 to 1.50 mass %.

Ni is an element useful to improve the texture of a hot-rolled sheet to obtain improved magnetic properties. However, Ni content below 0.03 mass % is less effective in improving magnetic properties, while Ni content above 1.50 mass % leads to unstable secondary recrystallization and degraded magnetic properties. Thus, Ni content is preferably 0.03 to 1.50 mass %.

In addition, Sn, Sb, Cu, P, Mo and Cr are elements useful to improve magnetic properties. However, if any of these elements is contained in an amount less than its lower limit described above, it is less effective to improve the magnetic properties, whereas if contained in an amount exceeding its upper limit described above, it inhibits the growth of secondary recrystallized grains. Thus, each of these elements is preferably contained in an amount within the above-described range.

The balance except the above-described elements is Fe and incidental impurities incorporated during the manufacturing process.

Then, the slab having the above-described chemical composition is subjected to heating before hot rolling in a conventional manner. However, the slab may also be subjected to hot rolling directly after casting without being subjected to heating. In the case of a thin slab, it may be subjected to hot rolling or proceed to the subsequent step, omitting hot rolling.

Further, the hot rolled sheet is optionally subjected to hot band annealing. As this moment, to obtain a highly-developed Goss texture in a product sheet, a hot band annealing temperature is preferably 800° C. to 1100° C. If a hot band annealing temperature is lower than 800° C., there remains a band texture resulting from hot rolling, which makes it difficult to obtain a primary recrystallization texture of uniformly-sized grains and impedes the growth of secondary recrystallization. On the other hand, if a hot band annealing temperature exceeds 1100° C., the grain size after the hot band annealing coarsens too much, which makes it extremely difficult to obtain a primary recrystallization texture of uniformly-sized grains.

In addition, the cooling rate during this hot band annealing needs to be controlled to be 40° C./s or higher on average within a temperature range of at least 750° C. to 350° C., as discussed previously.

After the hot band annealing, the sheet is subjected to cold rolling once, or twice or more with intermediate annealing performed therebetween, to be finished to a final sheet thickness, followed by decarburization (combined with recrystallization annealing) and subsequent application with an annealing separator. After the sheet is applied with the annealing separator, it is coiled and subjected to final annealing for purposes of secondary recrystallization and formation of a forsterite film. It should be noted that the annealing separator is preferably composed mainly of MgO in order to form forsterite. As used herein, the phrase "composed mainly of MgO" implies that any well-known compound for the annealing separator and any property-improving compound other than MgO may also be contained within a range without interfering with formation of a forsterite film.

In this case, the heating rate during this decarburization needs to be 50° C./s or higher on average at a temperature of at least 500° C. to 700° C., and the coil diameter needs to be 500 mm to 1500 mm, as discussed previously.

After the final annealing, it is effective to subject the sheet to flattening annealing to correct its shape. Insulation coating is applied to the surfaces of the steel sheet before or after the flattening annealing. As used herein, this insulating coating means such coating that may apply tension to the steel sheet for the purpose of reducing iron loss (hereinafter, referred to as "tension coating"). Tension coating includes inorganic coating containing silica and ceramic coating by physical vapor deposition, chemical vapor deposition, and so on.

After final cold rolling and before final annealing as mentioned above, we adhere, by printing or the like, an etching resist to a surface of the grain oriented electrical steel sheet, and then form linear grooves on a non-adhesion region of the steel sheet using electrolytic etching. In this case, by controlling particular fine grains present beneath the bottom portions of grooves, i.e., controlling the frequency of crystal grains, and by controlling average β angles of secondary recrystallized grains and intra-grain β-angle variation ranges as mentioned above, it is possible to provide a more significant improvement in iron loss property through magnetic domain refinement by groove formation, along with a sufficient magnetic domain refining effect.

It is preferable that each groove to be formed on a surface of the steel sheet has a width of about 50 μm to 300 μm, depth of about 10 μm to 50 μm and groove interval of about 1.5 mm to 10.0 mm, and that each groove deviates from a direction perpendicular to the rolling direction within a range of ±30°. As used herein, "linear" is intended to encompass solid line as well as dotted line, dashed line, and so on.

Except the above-mentioned steps and manufacturing conditions, any conventionally well-known method for manufacturing a grain oriented electrical steel sheet may be used appropriately where magnetic domain refining treatment is performed by forming grooves.

EXAMPLE 1

Steel slabs, each containing elements as shown in Table 1 as well as Fe and incidental impurities as the balance, were manufactured by continuous casting. Each of these steel slabs was heated to 1450° C., subjected to hot rolling to be finished to a hot-rolled sheet having a sheet thickness of 1.8 mm, and then subjected to hot band annealing at 1100° C. for 180 seconds. Subsequently, each steel sheet was subjected to cold rolling to be finished to a cold-rolled sheet having a final sheet thickness of 0.23 mm. In this case, the cooling rate within a temperature range of 350° C. to 750° C. during the cooling step of the hot band annealing was varied between 20° C./s and 60° C./s.

TABLE 1

| | Chemical Composition [mass %] (C, O, N, Al, Se, S: [mass ppm]) | | | | | | | | |
|---|---|---|---|---|---|---|---|---|---|
| Steel ID | C | Si | Mn | Ni | O | N | Al | Se | S |
| A | 500 | 2.95 | 0.05 | 0.1 | 18 | 80 | 250 | tr | 15 |

posed of 50% of colloidal silica and magnesium phosphate was applied to each steel sheet to be finished to a product, for which magnetic properties were evaluated.

For comparison, groove formation was also performed by a method using rolls with projections after completion of the final annealing. The groove formation condition was unchanged. Then, samples were collected from a number of sites in the coil to evaluate magnetic properties. It should be noted that along the longitudinal direction of the steel sheet, crystal orientations were measured in the rolling direction (RD) at intervals of 1 mm using the X-ray Laue method, and the grain size was determined under the condition where α angle is constant to measure intra-grain β-angle variations. In addition, selected as secondary recrystallized grains for which β-angle variation range is to be measured were those secondary recrystallized grains having a grain size of 10 mm or more.

The above-mentioned measurement results on iron loss and so on are shown in Table 2.

TABLE 2

| No. | On-site Coil Diameter (mm) | Groove Formation Method | Cooling Rate During Hot Band Annealing (° C./s) | Heating Rate During Decarburization (° C./s) | Average β Angle (°) | Average β-angle Variation Range (°) | Groove Frequency (%) | Iron Loss $W_{17/50}$ (W/kg) | Remarks |
|---|---|---|---|---|---|---|---|---|---|
| 1 | 400 | Electrolytic | 50 | 60 | 1.8 | 4.5 | 5 | 0.80 | Comparative Example |
| 2 | 1000 | Etching | 50 | 60 | 1.2 | 2.2 | 15 | 0.68 | Example |
| 3 | 1200 | | 50 | 25 | 2.8 | 4.2 | 0 | 0.82 | Comparative Example |
| 4 | 1200 | | 25 | 75 | 2.5 | 2 | 0 | 0.73 | Comparative Example |
| 5 | 1400 | | 60 | 60 | 1.5 | 2.8 | 5 | 0.68 | Example |
| 6 | 2000 | | 60 | 60 | 0.9 | 0.7 | 10 | 0.73 | Comparative Example |
| 7 | 600 | Rolls with | 70 | 60 | 1.5 | 2.8 | 50 | 0.73 | Comparative Example |
| 8 | 1200 | Projections | 70 | 60 | 0.9 | 1.8 | 50 | 0.73 | Comparative Example |
| 9 | 400 | Electrolytic | 50 | 60 | 1.4 | 4.6 | 10 | 0.80 | Comparative Example |
| 10 | 800 | Etching | 50 | 60 | 1.2 | 2.7 | 0 | 0.68 | Example |
| 11 | 800 | | 25 | 60 | 2.4 | 1.5 | 0 | 0.72 | Comparative Example |
| 12 | 800 | | 50 | 30 | 2.4 | 4.2 | 5 | 0.80 | Comparative Example |
| 13 | 1700 | | 50 | 60 | 1.2 | 0.5 | 5 | 0.72 | Comparative Example |

Thereafter, each steel sheet was applied with an etching resist by gravure offset printing. Then, each steel sheet was subjected to electrolytic etching and resist stripping in an alkaline solution, whereby linear grooves, each having a width of 200 μm and depth of 25 μm, were formed at intervals of 4.5 mm at an inclination angle of 7.5° relative to a direction perpendicular to the rolling direction.

Then, each steel sheet was subjected to decarburization where it was retained at a degree of oxidation $P(H_2O)/P(H_2)$ of 0.55 and a soaking temperature of 840° C. for 60 seconds. Then, an annealing separator composed mainly of MgO was applied to each steel sheet. Thereafter, each steel sheet was subjected to final annealing for the purposes of secondary recrystallization, formation of forsterite films and purification under the conditions of 1250° C. and 100 hours in a mixed atmosphere of $N_2$:$H_2$=70:30.

The heating rate during the decarburization was varied between 20° C./s and 100° C./s, and then the resulting coil would have an inner diameter of 300 mm and an outer diameter of 1800 mm during the final annealing. Thereafter, each steel sheet was subjected to flattening annealing at 850° C. for 60 seconds to correct its shape. Then, tension coating com- As shown in the table, where magnetic domain refining treatment was performed by groove formation using electrolytic etching, those grain oriented electrical steel sheets whose groove frequency, average β angle and average β-angle variation range fall within our range exhibited extremely good iron loss properties. However, other grain oriented electrical steel sheets that have any of groove frequency, average β angle and average β-angle variation range outside our range showed inferior iron loss properties.

The invention claimed is:

1. A grain oriented electrical steel sheet comprising: a forsterite film and tension coating on a surface of the steel sheet; and linear grooves for magnetic domain refinement on the surface of the steel sheet, wherein a proportion of linear grooves, each having crystal grains directly beneath itself, each crystal grain having an orientation deviating from a Goss orientation by 10° or more and a grain size of 5 μm or more, is 20% or less, and wherein secondary recrystallized grains are controlled to have an average β-angle of 2.0° or less, and each secondary recrystallized grain having a grain size of 10 mm or more has an average β-angle variation range of 1° to 4°.

2. A method of manufacturing a grain oriented electrical steel sheet according to claim 1, comprising:

subjecting a slab for a grain oriented electrical steel sheet to hot rolling to obtain a hot-rolled steel sheet;

then, optionally, subjecting the steel sheet to hot band annealing;

subjecting the steel sheet to subsequent cold rolling once, or twice or more with intermediate annealing performed therebetween, to be finished to a final sheet thickness; subjecting the steel sheet to subsequent decarburization;

then applying an annealing separator mainly composed of MgO to a surface of the steel sheet before subjecting the steel sheet to final annealing; and subjecting the steel sheet to subsequent tension coating, wherein (1) linear grooves are formed in a widthwise direction of the steel sheet by electrolytic etching before the final annealing to form a forsterite film, (2) an average cooling rate at a temperature of at least 750° C. to 350° C. is 40° C./s or higher during cooling at the time of the hot band annealing, (3) an average heating rate at a temperature of at least 500° C. to 700° C. is 50° C./s or higher during heating at the time of the decarburization, and (4) the final annealing is performed on the steel sheet in the form of a coil having a diameter of 500 mm to 1500 mm.

* * * * *